United States Patent
Wu et al.

(10) Patent No.: US 11,057,234 B2
(45) Date of Patent: Jul. 6, 2021

(54) DEVICE CONTROL METHOD AND APPARATUS

(71) Applicant: SHENZHEN ORVIBO TECHNOLOGY CO., LTD, Shenzhen (CN)

(72) Inventors: Lijuan Wu, Shenzhen (CN); Hailiang He, Shenzhen (CN)

(73) Assignee: SHENZHEN ORVIBO TECHNOLOGY CO.. LTD, Shenzhen (CN)

(*) Notice: Subject to any disclaimer, the term of this patent is extended or adjusted under 35 U.S.C. 154(b) by 7 days.

(21) Appl. No.: 16/640,724

(22) PCT Filed: Jul. 25, 2018

(86) PCT No.: PCT/CN2018/097073
§ 371 (c)(1),
(2) Date: Feb. 20, 2020

(87) PCT Pub. No.: WO2019/037567
PCT Pub. Date: Feb. 28, 2019

(65) Prior Publication Data
US 2020/0186370 A1    Jun. 11, 2020

(30) Foreign Application Priority Data
Aug. 21, 2017   (CN) .......................... 201710720488.9

(51) Int. Cl.
*H04L 12/18*   (2006.01)
*H04L 12/28*   (2006.01)
(Continued)

(52) U.S. Cl.
CPC .......... *H04L 12/185* (2013.01); *H04L 12/189* (2013.01); *H04L 12/28* (2013.01);
(Continued)

(58) Field of Classification Search
CPC ..... H04L 12/185; H04L 12/189; H04L 12/28; H04L 67/306; H04L 12/282;
(Continued)

(56) References Cited

U.S. PATENT DOCUMENTS 7,689,700 B2 * 3/2010 McNeil ............... H04L 67/1046
709/229
9,007,959 B2 * 4/2015 Verma ................. H04L 67/1051
370/254
(Continued)

FOREIGN PATENT DOCUMENTS

CN    105610781 A    5/2016
CN    106303024 A    1/2017
(Continued)

OTHER PUBLICATIONS

International Search Report issued in corresponding international application No. PCT/CN2018/097073, dated Oct. 18, 2018(4 pages).
Written Opinion of the international searching authority issued in corresponding International application No. PCT/CN2018/097073, dated Oct. 18, 2016(5 pages).
(Continued)

*Primary Examiner* — Afshawn M Towfighi

(57) ABSTRACT

The present disclosure provides a device control method and apparatus. The device control method includes: connecting to a current LAN and searching a device in the LAN; determining whether there is a created device management group corresponding to the device or more, wherein the device management group corresponds to one or more devices; when there is a created device management group, determining whether there is an account bound to the device management group; and when there is no account bound to the device management group, binding a current account of a user to the device management group, thereby obtaining control of the device corresponding to the device manage-
(Continued)

ment group according to a binding relationship between the current account of the user and the device management group.

20 Claims, 3 Drawing Sheets

(51) Int. Cl.
    *H04L 29/08*       (2006.01)
    *H04W 48/10*       (2009.01)
    *H04W 48/16*       (2009.01)

(52) U.S. Cl.
    CPC ........... *H04L 67/306* (2013.01); *H04W 48/10* (2013.01); *H04W 48/16* (2013.01)

(58) Field of Classification Search
    CPC ....... H04L 67/125; H04L 12/16; H04L 12/18; H04L 12/2803; H04W 48/10; H04W 48/16; H04W 4/70; H04W 12/08; H04W 48/14; G06F 21/41
    See application file for complete search history.

(56) References Cited

U.S. PATENT DOCUMENTS

| | | | | |
|---|---|---|---|---|
| 9,681,365 B2* | 6/2017 | Gupta | ..................... | H04W 4/08 |
| 10,091,625 B2* | 10/2018 | Levy | ................... | H04L 67/1046 |
| 2007/0162963 A1* | 7/2007 | Penet | ...................... | G06F 21/41 |
| | | | | 726/5 |
| 2009/0177790 A1* | 7/2009 | McNeil | ............... | H04L 67/1046 |
| | | | | 709/229 |

FOREIGN PATENT DOCUMENTS

| CN | 106789474 A | 5/2017 |
|---|---|---|
| CN | 107529169 A | 12/2017 |

OTHER PUBLICATIONS

First Office Action issued in corresponding priority Chinese application No. 201710720488.9, dated Mar. 12, 2019 (9 pages).
Notification to Grant Patent Right for Invention in corresponding priority Chinese application No. 201710720488.9, dated Aug. 20, 2019 (3 pages).

* cited by examiner

DEVICE CONTROL METHOD AND APPARATUS

CROSS-REFERENCE TO RELATED APPLICATIONS

This disclosure is a National Stage Entry of PCT application No. PCT/CN2018/097073 filed on Jul. 25, 2018, which claims the priority of a Chinese application No. "201710720488.9" filed on Aug. 21, 2017 by SHENZN-MEN ORVIBO TECH CO. LTD., which is entitled "device control method and apparatus".

TECHNICAL FIELD

The present disclosure relates to the computer technologies, in particular, to a device control method and apparatus.

BACKGROUND

As smart home devices are accepted and liked by more and more people, property developers continue to develop buildings with smart home system including smart home devices. Property developers will leave the building after installing and debugging each smart home system in the building. However, at this time, the building usually has not been delivered to its owner, thus, the smart home system cannot be delivered directly to the owner from property developers.

Technical Problem

At present, the following methods are adopted: 1. When the owner settles in, professionals are sent to reset the smart home system. 2. The smart home system account and password of each house are first kept by the property developers. After the house is sold out, the property developers deliver the account and password to the owner. The two methods have obvious shortcomings. For the first case, different owners will settle in the house at different time, therefore it is necessary to send the professionals to help these owners at different time, which requires a lot of labor costs. For the second case, many steps are involved. Property developers needs to create many different accounts for each of the houses, respectively, which is cumbersome and prone to error. Similarly, similar problems exist in the decoration and delivery of smart office and smart hotels.

SUMMARY

The main object of the present disclosure is to provide a device control method and apparatus, which are intended to quickly configure user's devices in a house and allow the user to control the devices in the house.

To achieve the above object, the present disclosure provides a device control method, where the device control method includes: connecting to a current LAN and searching a device in the LAN; determining whether there is a created device management group corresponding to the device or more, wherein the device management group corresponds to one or more devices; when there is a created device management group, determining whether there is an account bound to the device management group; and when there is no account bound to the device management group, binding a current account of a user to the device management group, thereby obtaining control of the device corresponding to the device management group according to a binding relationship between the current account of the user and the device management group.

Optionally, in the foregoing device control method, the device is a host, searching a device in the LAN includes broadcasting to find the host in the LAN and receiving the information of the host returned from the host.

Optionally, in the foregoing device control method, the device is a wireless device, searching a device in the LAN includes: obtaining external network information of the LAN after connecting to the LAN, and querying, according to a preset server configured to record external network information of a plurality of wireless device, the wireless device having the same external network information as that of the LAN.

Optionally, in the foregoing device control method, the device control method further includes: when there is an account bound to the device management group and the bound account is not the current account of the user, obtaining a request for joining the device management group sent by the user, binding the current account to the device management group after a preset administrator accepting the request, and obtaining control of the device corresponding to the device management group according to the binding relationship between the current account of the user and the device management group.

Optionally, in the foregoing device control method, controlling all the devices corresponding to the device management group according to the binding relationship between the current account of the user and the device management group includes: providing control information of all the devices corresponding to the device management group to the user through the current account, so that the user can control all the devices corresponding to the device management group according to the control information.

In order to achieve the above object, the present disclosure further provides a device control apparatus, the device control apparatus includes the following modules: a device searching module, configured to connect to a current LAN and search a device in the LAN; a device management group determining module, configured to determine whether there is a created device management group corresponding to the device or more, wherein the device management group corresponds to one or more devices; an account determining module, configured to determine whether there is an account bound to the device management group when there is a created device management group; and a binding module, configure to, when there is no account bound to the device management group, bind a current account of a user to the device management group, thereby obtaining control of the device corresponding to the device management group according to a binding relationship between the current account of the user and the device management group.

Optionally, in the foregoing device control apparatus, the device is a host, the device searching module is configured to broadcast to find the host in the LAN and receive the information of the host returned from the host.

Optionally, in the foregoing device control apparatus, the device is a wireless device, the device searching module is configured to obtain external network information of the LAN after connecting to the LAN, and query, according to a preset server configured to record external network information of a plurality of wireless device, the wireless device having the same external network information as that of the LAN.

Optionally, in the foregoing device control apparatus, wherein the binding module is configured to, when there is an account bound to the device management group and the bound account is not the current account of the user, obtain a request for joining the device management group sent by the user, bind the current account to the device management group after a preset administrator accepting the request, and obtaining control of the device corresponding to the device management group according to the binding relationship between the current account of the user and the device management group.

Optionally, in the foregoing device control apparatus, the binding module is configured to provide control information of the device corresponding to the device management group to the user through the current account, thereby enabling the user to control the device corresponding to the device management group according to the control information.

Beneficial Effect

Based on the embodiment of the disclosure, the property developer uses the account thereof to create a device management group, complete configuring the devices in the device management group, and unbinds the relationship between the account and the device management group in the end. When the user settles in the house and searches the smart home devices in the LAN of the house, the device management group of unbound state corresponding to the smart home devices will be found. Because the configuration of the devices of the device management group has been completed, the user can control the devices of the device management group after binding the account of his/her own with the device management group. The user can control the smart home devices quickly and accurately after setting in without repeating the operation of the property developer.

The implementation, functional features, and advantages of the present disclosure will be further described in the embodiments combined with the figures.

DETAILED DESCRIPTION OF THE EMBODIMENTS

It is understood that the specific embodiments described herein are merely illustrative of the disclosure and are not intended to limit the disclosure.

In the following description, the use of suffixes such as "module", "component" or "unit" for indicating an element is merely an explanation for facilitating the present disclosure and has no specific meaning. Therefore, "module", "component" or "unit" can be used in combination.

Figure 1:
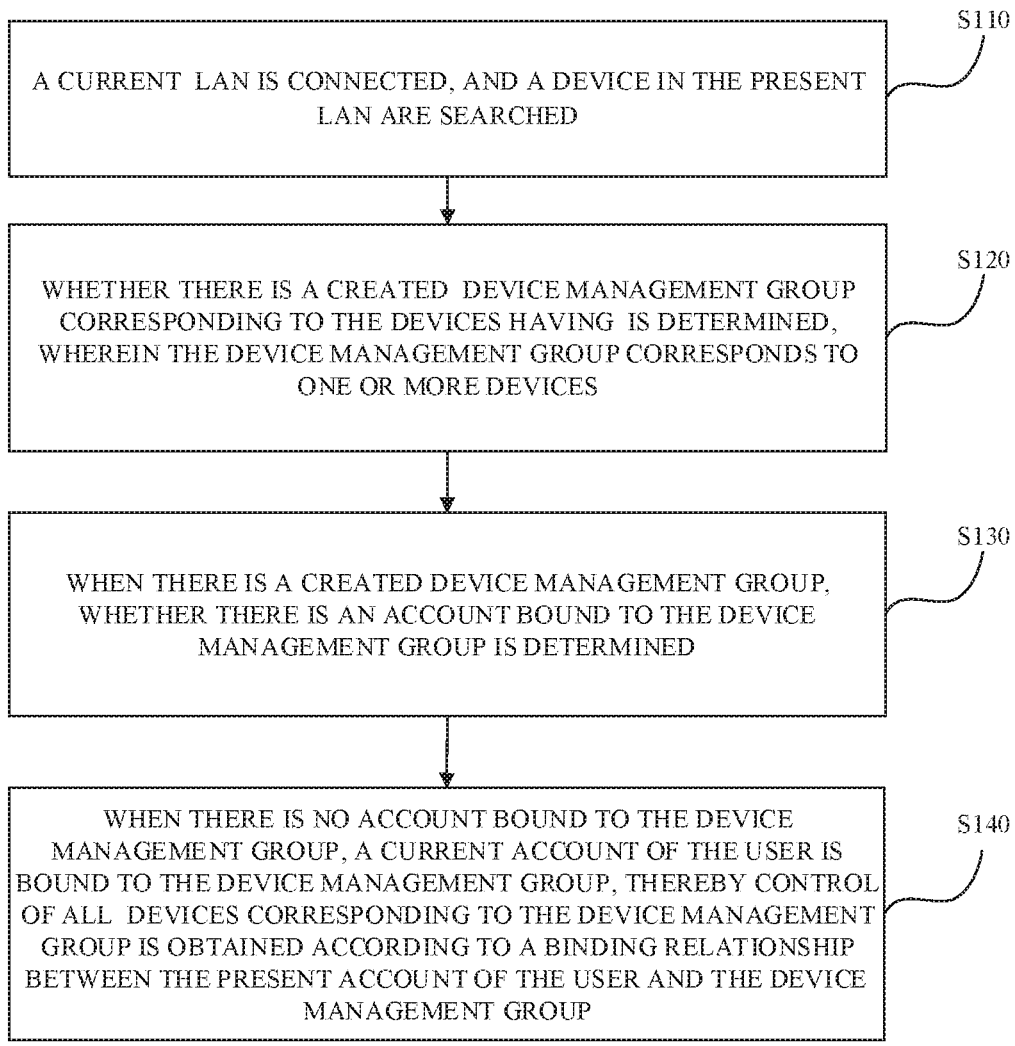
FIG. 1 is a flow chart of a device control method in accordance with one embodiment of the present disclosure.

As shown in FIG. 1, a device control method is provided in an embodiment of the present disclosure. The device control method in this embodiment includes the following steps:

Take a user setting in a building and taking over of smart home devices of the building (the building may be a house, an office or a hotel) as an example. Before that, a property developer of the building has created a device management group through its own account, added smart home devices (which may include hosts, Wi-Fi devices, Zigbee devices, RF devices, or Z-wave devices, etc.) into the device management group, and configured and debugged the smart home devices. Specifically, a client may be made according to the device control method of the embodiment. The property developer has registered an account A via the client running on a terminal (which may be a mobile phone, a tablet, a television, or a personal computer, etc.), created a device management group a for the housing, and added hosts, Wi-Fi devices, and other wireless devices into the device management group a. After the smart home devices are configured and debugged, the device management group a is deleted from the client to unbind the device management group a from the account A. Specifically, after the property developer removes the device management group a, a server receives an instruction of deleting the device management group a from the account A, and performs the following steps:

step 1), whether another account has been bound to the device management group to be deleted is determined. If yes, delete all bound accounts, and continue with step 2). If not, continue with step 2) directly.

step 2), whether there is a device in the device management group is determined. If not, unbind the device management group from the account and delete the device management group from the server completely. If yes, unbind the device management group from the account, and retain the device management group as well as the device and configurations thereof. The device management group is thus in an unbound state. For example, the deleted device management group a is in the unbound state.

Step S110, a current LAN (local area network) is connected, and a device in the current LAN are searched.

In this embodiment, the LAN is usually a local area network set up by a router in the building, and the devices in the building are connected to the LAN. Specifically, after a user settling in the house, a client is run on a terminal, and an account B is registered on the client by the user. The client initiates an instruction to search for a device management group in the LAN.

Step S120, whether there is a created device management group corresponding to the device is determined, wherein the device management group corresponds to one or more devices.

In this embodiment, the information of devices, the information of the device management groups, and the correspondence between the devices and the device management groups may be recorded on a preset server. Therefore, it will be performed by the server to search the device management group via the devices.

Step S130, when there is a created device management group, whether there is an account bound to the device management group is determined.

In this embodiment, similarly, a binding relationship between the device management group and account thereof is also recorded on the server.

Take the user controls the smart home devices after settling in the house as an example. The steps after finding a device will performed as follows.

Step 1), whether the device has a binding relationship with a device management group is determined. If not, the device is deemed as a device not added by any device management group, which will be returned to the client. The client will not show the device having been found. If yes, continue with step 2).

Step 2), whether there is a binding relationship of the device management group is determined. If not, the device is deemed as a device of a device management group having been deleted. The server returns a corresponding information of the device management group (such as the device management group a) and the unbound state to the client.

Step S140, when there is no account bound to the device management group, a current account of the user is bound to the device management group, thereby control of the device corresponding to the device management group is obtained according to a binding relationship between the current account of the user and the device management group.

In this embodiment, the device management group a of unbound state is bound to an account B. Specifically, the client initiates a joining request to the device management group (such as the device management group a) of unbound state. The server binds the account B to the device management group a, and the device of the device management group a with the configuration thereof are returned to the account B. Thus, the account B can directly control the entire smart home devices on the client. A take-over of the smart home devices is completed.

Similarly, this embodiment may be also applicable to a smart office scenario. For example, after the property developer completes configuring the office devices via the account A, the office devices have been added to the device management group a, and the binding relationship between the account A and the device management group a is unbound. When a user rents the office, the device management group a of unbound state is queried via an account B. The account B is bound to the device management group a to obtain a control of the office devices.

Based on the embodiment of the disclosure, the property developer uses the account thereof to create a device management group, complete configuring the devices in the device management group, and unbinds the relationship between the account and the device management group in the end. When the user settles in the house and searches the smart home devices in the LAN of the house, the device management group of unbound state corresponding to the smart home devices will be found. Because the configuration of the devices of the device management group has been completed, the user can control the devices of the device management group after binding the account of his/her own with the device management group. The user can control the smart home devices quickly and accurately after setting in without repeating the operation of the property developer.

Figure 2:
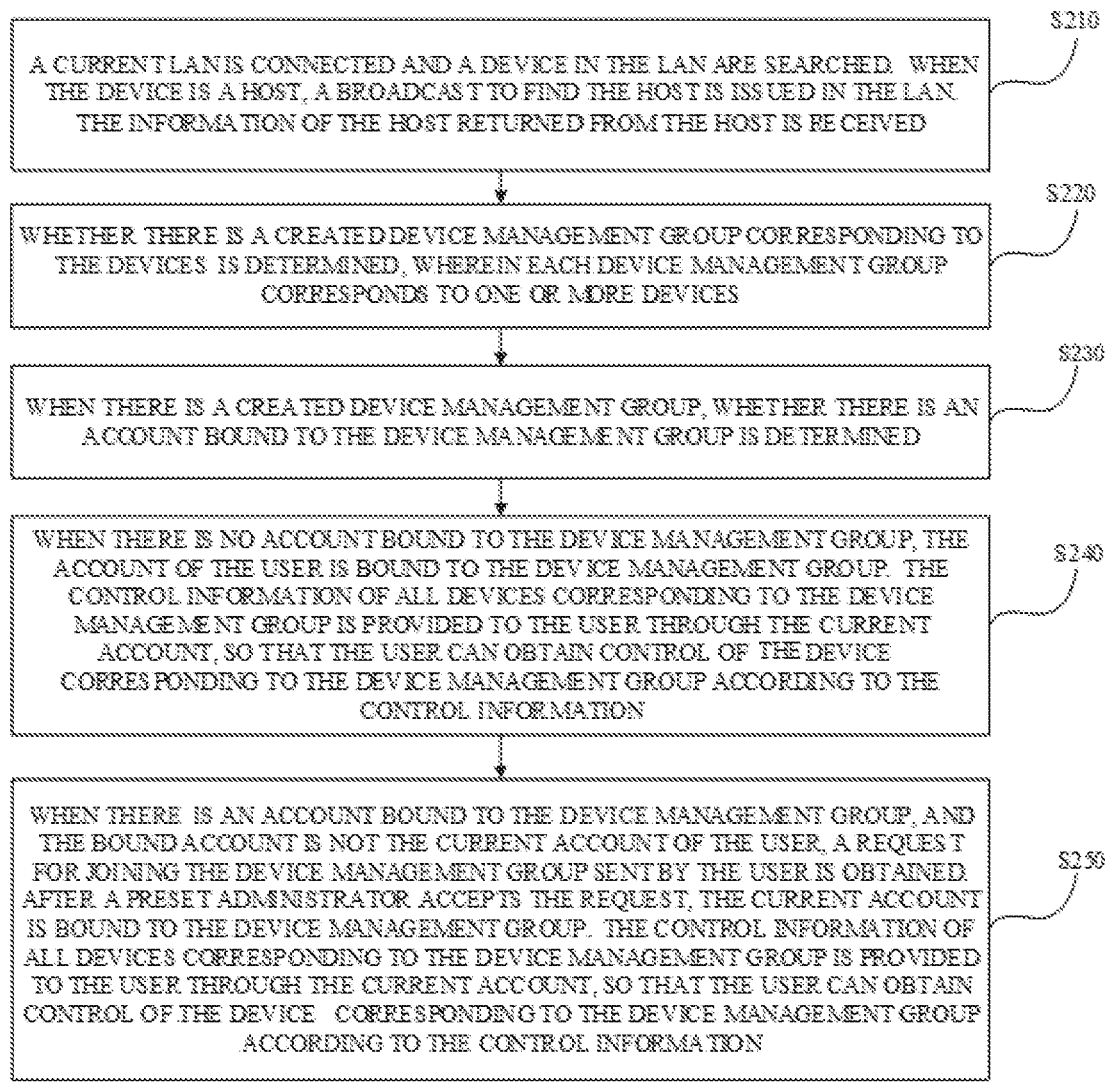
FIG. 2 is a flow chart of a device control method according to an embodiment of the present disclosure.

As shown in FIG. 2, an embodiment of the present disclosure includes the following steps:

Step S210, a current LAN is connected and a device in the LAN are searched. When the device is a host, a broadcast to find the host is issued in the LAN. The information of the host returned from the host is received.

In this embodiment, the information of the host is not limited, for example, it may be a physical address of the host.

In this embodiment, the client issues the broadcast for searching the hosts. The hosts that receive the broadcast in the LAN will report their own MAC (physical address) addresses to the client. The client uses the MAC addresses of the hosts to query the status of the hosts one by one through the server. The information of the device management group will be found according to the status of the hosts.

In this embodiment, an alternative solution is also provided:

The device may be a wireless device, such as a Wi-Fi device. The external network information of the LAN is obtained after connected to the LAN. The wireless devices having the same external network information as the LAN are queried according to a preset server having been recorded external network information of several wireless devices.

In this embodiment, the external network information of the Wi-Fi device is not limited. For example, the external network information may be an external network address and a service set identifier.

In this embodiment, the client sends an instruction to the server for searching Wi-Fi devices in the LAN. The client initiates an external network IP (network address) and SSID (service set identifier) to the server. The server searches the Wi-Fi devices with the same external network IP and SSID as the client. The information of the device management group will be found according to the status of the Wi-Fi devices after finding the qualified Wi-Fi devices.

Step S220, whether there is a created device management group corresponding to the devices is determined, wherein each device management group corresponds to one or more devices.

Step S230, when there is a created device management group, whether there is an account bound to the device management group is determined.

In step S240, when there is no account bound to the device management group, the account of the user is bound to the device management group. The control information of the device corresponding to the device management group is provided to the user through the current account, so that the user can obtain control of the device corresponding to the device management group according to the control information.

In step S250, when there is an account bound to the device management group, and the bound account is not the current account of the user, a request for joining the device management group sent by the user is obtained. After a preset administrator accepts the request, the current account is bound to the device management group. The control information of the device corresponding to the device management group is provided to the user through the current account, so that the user can obtain control of the device corresponding to the device management group according to the control information.

In this embodiment, when the device management group is bound to an account, whether the account is the current login account is further determined. When the account is the current login account, it indicates that the devices belong to another device management group bound to the current account (for one account can be added several different device management groups). When the account is not the current login account, it indicates that the devices belong to the device management group bound to another current account. The server returns the corresponding device management group information and account binding information of the device management group to the client. The current account can apply to join the device management group. The current account may be bound to the device management group as a member with the administrator's permission.

According to the embodiment of present disclosure, when smart home devices in a house are controlled by previous users by adding them to a device management group, subsequent users may join the device management group to control the smart home devices.

Figure 3:
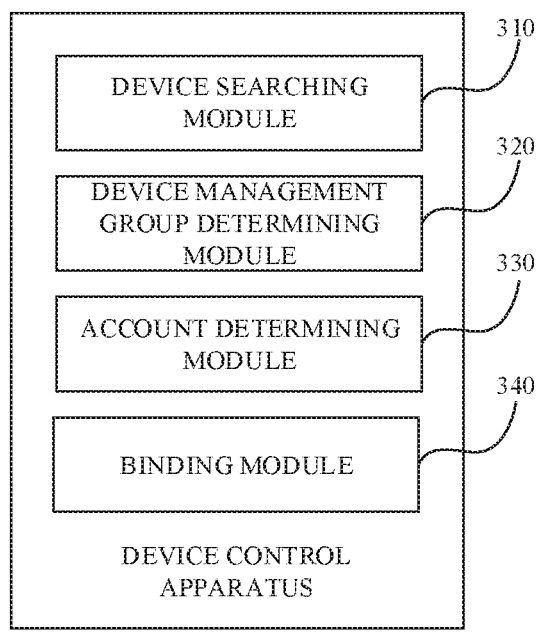
FIG. 3 is a block diagram of a device control apparatus in accordance with one embodiment of the present disclosure.

As shown in FIG. 3, a device control apparatus is provided in an embodiment of the present disclosure. The device control apparatus in this embodiment includes the following steps.

Take a user setting in a building and taking over of smart devices of the building (the building may be a house, an office or a hotel) as an example. Before that, a property developer of the building has created a device management group through its own account, added smart home devices (which may include hosts, Wi-Fi devices, Zigbee devices, RF devices, or Z-wave devices, etc.) into the device management group, and configured and debugged the smart home devices. Specifically, a client may be made according to the device control method of the embodiment. The property developer has registered an account A via the client running on a terminal (which may be a mobile phone, a tablet, a television, or a personal computer, etc.), created a device management group a for the housing, added hosts, Wi-Fi devices, and other wireless devices into the device management group a. After the smart home devices are configured and debugged, the device management group a is deleted from the client to unbind the device management group a from the account A. Specifically, after the property developer removes the device management group a, a server receives an instruction of deleting the device management group a from the account A and performs the following steps.

step 1), whether another account has been bound to the device management group to be deleted is determined. If yes, delete all bound accounts, and continue with step 2). If not, continue with step 2) directly.

step 2), whether there are devices in the device management group is determined. If not, unbind the device management group from the account and delete the device management group from the server completely. If yes, unbind the device management group from the account, and retain the device management group as well as the device and configurations thereof. The device management group is thus in an unbound state. For example, the deleted device management group a is in the unbound state.

A device searching module 310, a current LAN (local area network) is connected, and a device in the current LAN are searched.

In this embodiment, the LAN is usually a local area network set up by a router in the building, and the devices in the building are connected to the LAN. Specifically, after a user settling in the house, a client is run on a terminal, and an account B is registered on the client by the user. The client initiates an instruction to search for a device management group in the LAN.

A device management group determining module 320, whether there is a created device management group corresponding to the devices is determined, wherein the device management group corresponds to one or more devices.

In this embodiment, the information of devices, the information of the device management groups, and the correspondence between the devices and the device management groups may be recorded on a preset server. Therefore, it will be performed by the server to search the device management group via the devices.

An account determining module 330, when there is a created device management group, whether there is an account bound to the device management group is determined.

In this embodiment, similarly, a binding relationship between the device management group and account thereof is also recorded on the server.

Take the user controls the smart home devices after settling in the house as an example. The steps after finding a device will performed as follows.

Step 1), whether the devices have a binding relationship with a device management group is determined. If not, the device is deemed as a device not added by any device management group, which will be returned to the client. The client will not show the device having been found. If yes, continue with step 2);

Step 2), whether there is a binding relationship of the device management group is determined. If not, the device is deemed as a device of a device management group having been deleted. The server returns a corresponding information of the device management group (such as the device management group a) and the unbound state to the client.

A binding module 340, when there is no account bound to the device management group, a current account of the user is bound to the device management group, thereby control of the device corresponding to the device management group is obtained according to a binding relationship between the current account of the user and the device management group.

In this embodiment, the device management group a of unbound state is bound to an account B. Specifically, the client initiates a joining request to the device management group (such as the device management group a) of unbound state. The server binds the account B to the device management group a, and the device of the device management group a with the configuration thereof are returned to the account B. Thus, the account B can directly control the entire smart home devices on the client. A take-over of the smart home devices is completed.

Similarly, this embodiment may be also applicable to a smart hotel scenario. For example, after the property developer completes configuring the office devices via the account A, the office devices have been added to the device management group a, and the binding relationship between the account A and the device management group a is unbound. When a user rents the office, the device management group a of unbound state is queried via an account B. The account B is bound to the device management group a to obtain a control of the office devices.

Based on the embodiment of the disclosure, the property developer uses the account thereof to create a device management group, complete configuring the devices in the device management group, and unbinds the relationship between the account and the device management group in the end. When the user settles in the house and searches the smart home devices in the LAN of the house, the device management group of unbound state corresponding to the smart home devices will be found. Because the configuration of the devices of the device management group has been completed, the user can control the devices of the device management group after binding the account of his/her own with the device management group. The user can control the smart home devices quickly and accurately after setting in without repeating the operation of the property developer.

An embodiment of the present disclosure provides a device control apparatus. The device control apparatus includes the following modules.

A device searching module 310, a current LAN is connected and a device in the LAN are searched. When the device is a host, a broadcast to find the host is issued in the LAN. The information of the host returned from the host is received.

In this embodiment, the information of the host is not limited, for example, it may be a physical address of the host.

In this embodiment, the client issues the broadcast for searching the hosts. The hosts that receive the broadcast in the LAN will report their own MAC (physical address) addresses to the client. The client uses the MAC addresses of the hosts to query the status of the hosts one by one through the server. The information of the device management group will be found according to the status of the hosts.

In this embodiment, an alternative solution is also provided.

The device may be a wireless device, such as a Wi-Fi device. The external network information of the LAN is obtained after connected to the LAN. The wireless devices having the same external network information as the LAN are queried according to a preset server having been recorded external network information of several wireless devices.

In this embodiment, the external network information of the Wi-Fi device is not limited. For example, the external network information may be an external network address and a service set identifier.

In this embodiment, the client sends an instruction to the server for searching Wi-Fi devices in the LAN. The client initiates an external network IP (network address) and SSID (service set identifier) to the server. The server searches the Wi-Fi devices with the same external network IP and SSID as the client. The information of the device management group will be found according to the status of the Wi-Fi devices after finding the qualified Wi-Fi devices.

A device management group determining module 320, whether there is a created device management group corresponding to the devices is determined, wherein each device management group corresponds to one or more devices.

An account determining module 330, When there is a created device management group, whether there is an account bound to the device management group is determined.

A binding module 340, when there is no account bound to the device management group, the account of the user is bound to the device management group. The control information of the device corresponding to the device management group is provided to the user through the current account, so that the user can obtain control of the device corresponding to the device management group according to the control information.

The binding module 340, when there is an account bound to the device management group, and the bound account is not the current account of the user, a request for joining the device management group sent by the user is obtained. After a preset administrator accepts the request, the current account is bound to the device management group. The control information of the device corresponding to the device management group is provided to the user through the current account, so that the user can obtain control of the device corresponding to the device management group according to the control information.

In this embodiment, when the device management group is bound to an account, whether the account is the current login account is further determined. When the account is the current login account, it indicates that the devices belong to another device management group bound to the current account (for one account can be added several different device management groups). When the account is not the current login account, it indicates that the devices belong to the device management group bound to another current account. The server returns the corresponding device management group information and account binding information of the device management group to the client. The current account can apply to join the device management group. The current account may be bound to the device management group as a controller with the administrator's permission.

According to the embodiment of present disclosure, when smart home devices in a house are controlled by previous users by adding them to a device management group, subsequent users may join the device management group to control the smart home devices.

It is to be understood that the term "comprises", "comprising", or any other variants thereof, is intended to encompass a non-exclusive inclusion, such that a process, method, article, or device comprising a series of elements includes those elements. It also includes other elements that are not explicitly listed, or elements that are inherent to such a process, method, article, or device. An element that is defined by the phrase "comprising a . . . " does not exclude the presence of additional equivalent elements in the process, method, item, or device that comprises the element.

The serial numbers of the embodiments of the present disclosure are merely for the description, and do not represent the advantages and disadvantages of the embodiments.

Through the description of the above embodiments, person skilled in the art can clearly understand that the foregoing embodiment method can be implemented by means of software plus a necessary general hardware platform, and of course, can also be through hardware, but in many cases, the former is better. Based on such understanding, the technical solution of the present disclosure, which is essential or contributes to the prior art, may be embodied in the form of a software product stored in a storage medium (such as ROM/RAM, disk, the optical disc) including a number of instructions executed by a terminal (which may be a mobile phone, a computer, a server, an air conditioner, or a network device, etc.) to perform the methods described in various embodiments of the present disclosure.

The embodiments of the present disclosure have been described above with reference to the drawings, but the present disclosure is not limited to the specific embodiments described above, and the specific embodiments described above are merely illustrative and not restrictive, and person skilled in the art in the light of the present disclosure may make many forms without departing from the spirit and scope of the disclosure as claimed.

INDUSTRIAL APPLICABILITY

Based on the embodiment of the disclosure, the property developer uses the account thereof to create a device management group, complete configuring the devices in the device management group, and unbinds the relationship between the account and the device management group in the end. When the user settles in the house and searches the smart home devices in the LAN of the house, the device management group of unbound state corresponding to the smart home devices will be found. Because the configuration of the devices of the device management group has been completed, the user can control the devices of the device management group after binding the account of his/her own with the device management group. The user can control the smart home devices quickly and accurately after setting in without repeating the operation of the property developer.

What is claimed is:
1. A device control method, comprising:
connecting to a current LAN and searching a device in the LAN;
determining whether there is a created device management group corresponding to the device or more, wherein the device management group corresponds to one or more devices;
when there is a created device management group, determining whether there is an account bound to the device management group; and when there is no account bound to the device management group, binding a current account of a user to the device management group, thereby obtaining control of the device corresponding to the device management group according to a binding relationship between the current account of the user and the device management group.

2. The device control method according to claim 1, wherein the device is a host, searching a device in the LAN comprises:
broadcasting to find the host in the LAN and receiving the information of the host returned from the host.

3. The device control method according to claim 1, wherein the device is a wireless device, searching a device in the LAN comprises:
obtaining external network information of the LAN after connecting to the LAN, and querying, according to a preset server configured to record external network information of a plurality of wireless device, the wireless device having the same external network information as that of the LAN.

4. The device control method according to claim 1, further comprising:
when there is an account bound to the device management group and the bound account is not the current account of the user, obtaining a request for joining the device management group sent by the user,
binding the current account to the device management group after a preset administrator accepting the request, and
obtaining control of the device corresponding to the device management group according to the binding relationship between the current account of the user and the device management group.

5. The device control method according to claim 1, wherein controlling all the devices corresponding to the device management group according to the binding relationship between the current account of the user and the device management group comprises:
providing control information of the device corresponding to the device management group to the user through the current account, thereby enabling the user to control the device corresponding to the device management group according to the control information.

6. A device control apparatus, comprising:
a device searching module, configured to connect to a current LAN and search a device in the LAN;
a device management group determining module; configured to determine whether there is a created device management group corresponding to the device or more, wherein the device management group corresponds to one or more devices;
an account determining module, configured to determine whether there is an account bound to the device management group when there is a created device management group; and
a binding module, configure to, when there is no account bound to the device management group, bind a current account of a user to the device management group, thereby obtaining control of the device corresponding to the device management group according to a binding relationship between the current account of the user and the device management group.

7. The device control apparatus according to claim 6, wherein the device is a host, the device searching module is configured to broadcast to find the host in the LAN and receive the information of the host returned from the host.

8. The device control apparatus according to claim 6, wherein the device is a wireless device, the device searching module is configured to obtain external network information of the LAN after connecting to the LAN, and query, according to a preset server configured to record external network information of a plurality of wireless device, the wireless device having the same external network information as that of the LAN.

9. The device control apparatus according to claim 6, wherein the binding module is configured to, when there is an account bound to the device management group and the bound account is not the current account of the user, obtain a request for joining the device management group sent by the user, bind the current account to the device management group after a preset administrator accepting the request, and obtain control of the device corresponding to the device management group according to the binding relationship between the current account of the user and the device management group.

10. The device control apparatus according to claim 6, wherein the binding module is configured to provide control information of the device corresponding to the device management group to the user through the current account, thereby enabling the user to control the device corresponding to the device management group according to the control information.

11. The device control method according to claim 1, before connecting to the current LAN and searching the device in the LAN, the method further comprising:
sending an instruction of deleting a management group from a bound account thereof.

12. The device control method according to claim 1, after searching the device in the LAN and finding the device, before binding the current account of the user to the device management group, the method further comprising:
determining whether the device have a binding relationship with the device management group; and
when the device has no binding relationship, hiding information of the device.

13. The device control method according to claim 12, further comprising:
when the device has a binding relationship with the device management group, determining whether there is a binding relationship between the device management group and an account;
when there is no account bound to the device management group, receiving information of the device management group of unbound state.

14. The device control apparatus according to claim 6, the apparatus further comprising:
a sending module, configured to send an instruction of deleting a management group from a bound account thereof.

15. The device control apparatus according to claim 6, further comprising:
a determining module, configured to determine whether the device has a binding relationship with the device management group; and
a hiding module, configured to, when the device has no binding relationship, hide information of the device.

16. The device control apparatus according to claim 15, the determining module further configured to, when the device has a binding relationship with the device management group, determine whether there is a binding relationship between the device management group and an account; and the device control apparatus further comprising a receiving module, configured to, when there is no account bound to the device management group, receive information of the device management group of unbound state.

17. A device control method, applied to a server, the method comprising:

recording information of a device, information of a device management group, a correspondence between the device and the device management group, and a binding relationship between the device management group and the corresponding account;

receiving an instruction of deleting a device management group from a binding account thereof;

finding an account bound to the device management group; and deleting the account.

18. The device control method according to claim 17, finding an account bound to the device management group further comprising:

determining whether there is another account having been bound to the device management group to be deleted;

when there is another account having been bound to the device management group, deleting the bound account.

19. The device control method according to claim 18, further comprising:

when there is no other account having been bound to the device management group, determining whether there is a device in the device management group;

when there are no devices in the device management group, unbinding the device management group from the account and deleting the device management group.

20. The device control method according to claim 19, further comprising:

when there is a device in the device management group, unbinding the device management group from the account, and retaining the device management group as well as the device and configurations thereof.

* * * * *